(12) United States Patent  (10) Patent No.: US 7,403,912 B2
Rivera et al.  (45) Date of Patent: Jul. 22, 2008

(54) COMPUTER SOFTWARE PRODUCT AND METHOD FOR SHARING IMAGES AND ORDERING IMAGE GOODS OR SERVICES

(75) Inventors: Jose E. Rivera, Rochester, NY (US); Andrew Sailus, Brockport, NY (US); Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 543 days.

(21) Appl. No.: 10/732,070

(22) Filed: Dec. 10, 2003

(65) Prior Publication Data

US 2005/0131765 A1 Jun. 16, 2005

(51) Int. Cl.
*G06Q 30/00* (2006.01)
(52) U.S. Cl. .......................... 705/26; 705/27
(58) Field of Classification Search ............ 705/26, 705/27
See application file for complete search history.

(56) References Cited

U.S. PATENT DOCUMENTS

| | | | | |
|---|---|---|---|---|
| 6,913,193 | B1* | 7/2005 | Kawan | 235/380 |
| 2002/0042750 | A1* | 4/2002 | Morrison | 705/26 |
| 2003/0055780 | A1* | 3/2003 | Hansen et al. | 705/39 |
| 2003/0069812 | A1* | 4/2003 | Yuen et al. | 705/27 |
| 2004/0230535 | A1* | 11/2004 | Binder et al. | 705/64 |
| 2005/0003893 | A1* | 1/2005 | Hogwood et al. | 463/42 |
| 2005/0131765 | A1* | 6/2005 | Rivera et al. | 705/26 |

FOREIGN PATENT DOCUMENTS

WO  WO 2004/042515  * 5/2004

OTHER PUBLICATIONS

Storey, Charlene, "Down, but not out", Credit Union Management, Nov. 2000.*
Calaghan, Dennis, ".net making sence for CRM developers; Salesforce.com, Firstwave, Banter follow Microsoft in creating CRM applications for .net technology", eWeek, Aug. 19, 2002.*

* cited by examiner

*Primary Examiner*—Mark Fadok
(74) *Attorney, Agent, or Firm*—Frank Pincelli

(57) ABSTRACT

A method and software is provided for placing an order for goods and/or services from a remote service provider over a communication network from a subscriber's computer, comprising the steps of: providing preprogrammed software on the subscriber's computer for allowing the subscriber to prepare the order while the subscriber's computer is not connected to a computer server of the remote service provider over the communications network; the subscriber creating the order using the preprogrammed software; the preprogrammed software displaying the subscriber's account status to the subscriber after preparing the order but prior to connecting to the remote service provider over the communications network; and the subscriber forwarding the order for goods and/or services to the remote service provider over the communications network.

44 Claims, 16 Drawing Sheets

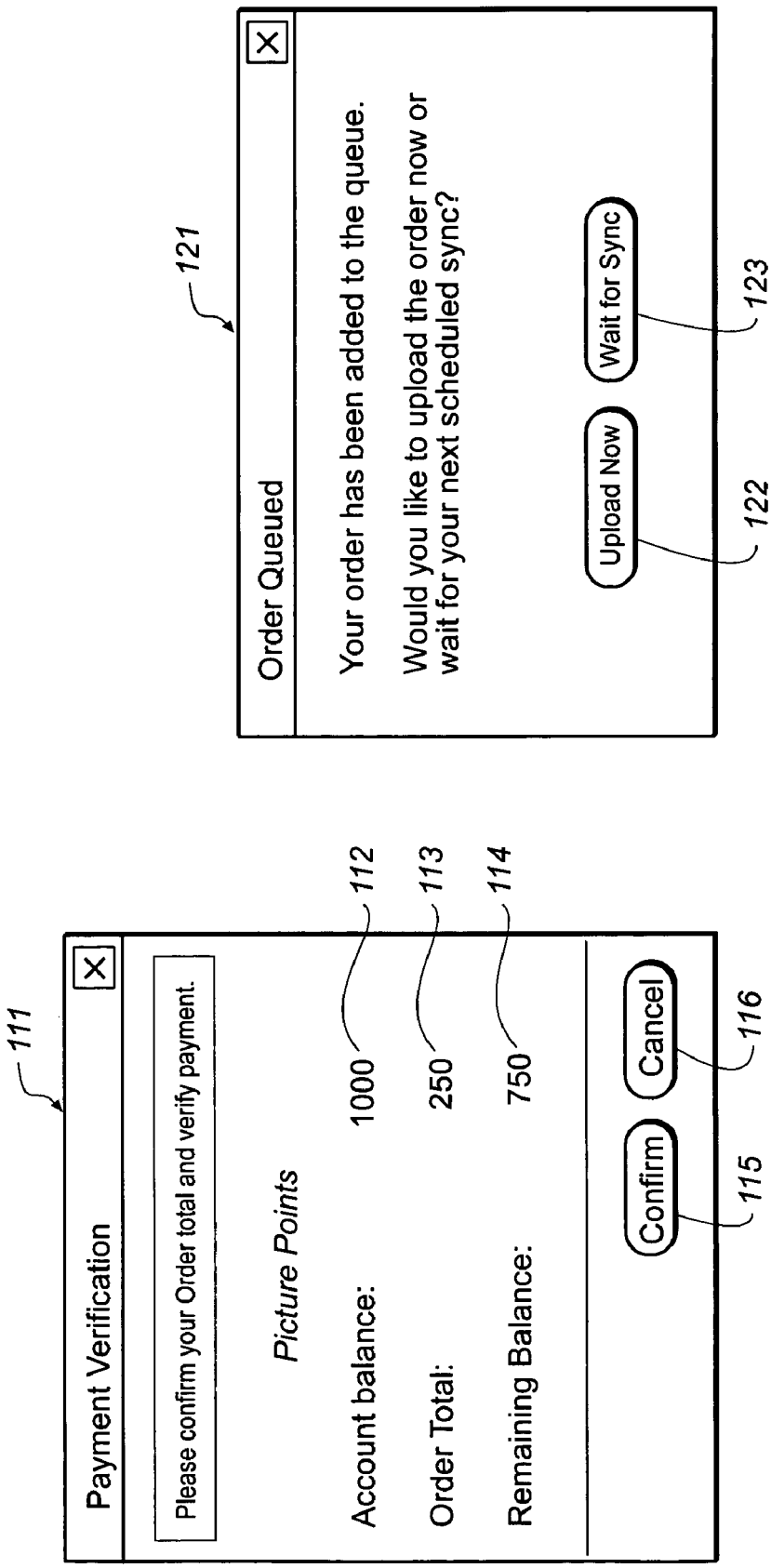

COMPUTER SOFTWARE PRODUCT AND METHOD FOR SHARING IMAGES AND ORDERING IMAGE GOODS OR SERVICES

FIELD OF THE INVENTION

The present invention relates to software for the sharing of images and ordering of image-related goods and services. In particular it relates to the simplified sharing of images and ordering of image-related goods and services in an on-line environment.

BACKGROUND OF THE INVENTION

With the advent of digital cameras, consumers capture picture memories and subsequently store them either on their own personal computers or by utilizing one of a number of online Internet photographic service sites (e.g., OFOTO™, or Kodak Picture Center Online™) which offer storage. At the same time the number of images captured by digital camera has increased, the percentage of these images being printed has decreased. This is due to many reasons, for example consumers selecting only their very best images to be printed, or the printing solutions themselves being too difficult to use for all except the most experienced computer users.

The options available for obtaining prints from a digital camera include printing at home, which can be very challenging, and which sometimes produces less than desirable quality prints. In addition, the materials needed for home photo printing (typically inkjet cartridges and photo-quality print paper) can be quite expensive.

Consumers can also order hard copy prints and other image products online from an Internet photographic service (e.g. OFOTO™) site where their images are stored, but this, too, involves many steps including the use of multiple user interface screens. Typically, obtaining prints from a remote photographic service site requires first connecting to the site and then uploading the images to the user's account. Uploading can be a slow and cumbersome process, especially if a narrow band-width dial-up connection to the Internet is used. To place a print order, a user must remain connected to the service site while carrying out a number of steps to specify which images are to be printed, and the quantities desired. This process can be slow even when a broad-band connection to the Internet is available, especially when traffic on the service site is high. The user must progress through several screens and often there is wait time for the next screen to appear. Finally, an e-commerce step must be carried out to arrange payment, typically involving a transaction such as the entry of the credit-card which then requires a wait for confirmation of validity.

The social exchange of hard copy prints as a means of sharing pictures has also always been popular. When using film for image capture, a convenient means for sharing prints was employed by many consumers when they selected the option of getting two sets of prints from a photo processing service. The consumer would keep one copy of a print, while the second copy was used for sharing with family and friends. Now, because of the problems previously mentioned with obtaining prints from digital cameras, the sharing of pictures by means of hard copy prints from digital cameras has decreased. And no matter the source of the hard copy print (from film or digital), there is extra work associated with sharing by sending prints by mail. Envelopes have to be addressed and stamped, notes written, and a trip to the post office must be made. Prints ordered remotely from a photographic service site may be shipped to an address of recipient for sharing, but the complexity of this multi-step task has already been described.

A new means of social sharing of images enabled by digital technology has recently emerged. So-called electronic sharing of images often involves the e-mailing of a digital image file as an attachment or the posting of images to a personal website or a photo website such as Ofoto™. While this is an increasingly popular means of sharing images, it, too, can be complex, requiring multiple steps. In sharing via a website, a URL must first be supplied to the recipient who must, in turn, access the website in order to view the images. When emailing images, the sharer must also decide what size digital image to share (e.g., a smaller size to facilitate transfer but suitable for display only, or a larger size for printing but slower to transfer) and understand how to resize the image appropriately if resizing is needed.

Finally, if a consumer wishes to share the same set of images using email and prints, it is necessary to follow two distinct, multi-step workflows.

Thus there is a need to provide a greatly simplified means for consumers to share digital images with friends and family by electronic sharing, or by means of hard copy prints, and also to simplify the ordering of image-related goods or services on-line.

SUMMARY OF THE INVENTION

In answer to these and other needs there is provided by the present invention, a method for placing an order for goods and/or services from a remote service provider over a communication network from a subscriber's computer, comprising the steps of providing preprogrammed software program for use on the subscriber computer for accessing the subscriber's personal digital image file collection on the subscriber computer, and allowing the subscriber to prepare the order while the subscriber computer is not connected to a computer server of the remote service provider over the communications network; and the subscriber creating the order using the preprogrammed software on the subscriber computer, the preprogrammed software displaying the subscriber's account status to the subscriber after preparing the order but prior to connecting to the remote service provider over the communications network; and the subscriber computer forwarding the order for image-related goods and/or services to the remote service provider over the communications network.

In another aspect of the present invention, there is also provided a computer software program that when loaded on to a subscriber computer, the software program will cause the subscriber computer to perform the steps of:

creating a complete subscriber order on the computer;

forwarding the completed subscriber order of goods and/or services to a server at a remote service provider over a communication network with respect to an account of the subscriber located at the service provider; and allowing the software program to be automatically updated at the time the order is received by the service provider so as to reflect the placement of the order and/or provide updated information to the software program.

In accordance with yet another aspect of the present invention, there is provided a computer software program that when loaded on to a subscriber computer, the software program will cause the subscriber computer to perform the steps of:

creating a complete subscriber order on the computer;

forwarding the completed subscriber order of goods and/or services to a server at a remote service provider over a communication network with respect to an account of the subscriber located at the service provider at later time when the subscriber is not using the software program; and updating the status of the subscriber account when the subscriber computer is connected to the remote service provider's computer server.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIGS. 7a-7l depict computer screens made according to the invention.

DETAILED DESCRIPTION OF THE INVENTION

The present invention provides preprogrammed software that runs on a user's computer and enables the user of this software to easily and automatically connect with the server of a remotely located photographic service provider. The preprogrammed software greatly simplifies both the ordering of photographic goods and services from the service provider and the sharing of images with friends and family. The software provides a unified user-interface that enables a subscriber to compose an order for prints or for image sharing quickly and completely, without first establishing a communication connection from the user's computer to the service provider. Once the order has been completed off line, it will be uploaded automatically to the service provider at a pre-arranged time without requiring the further attention or action of the subscriber. The pre-programmed software also incorporates an accounting system which allows orders to be placed using previously established credit, without the necessity of carrying out a separate financial transaction for each order. The software also comprises an order database of stored pre-routed addresses that can be used for sharing of images either by email or conventional mail. As a result of combining all these steps, the user can choose images, select the people with whom they wish to share from a list of names, and by simply selecting an option to "proceed", be assured the software will automatically cause the server of the photographic service provider to carry out actions that deliver the images to the recipients via email or hard copy prints via postal mail without the sender having to perform any additional steps. At the same time the status of the user's credits in his account is updated automatically.

Figure 1A:
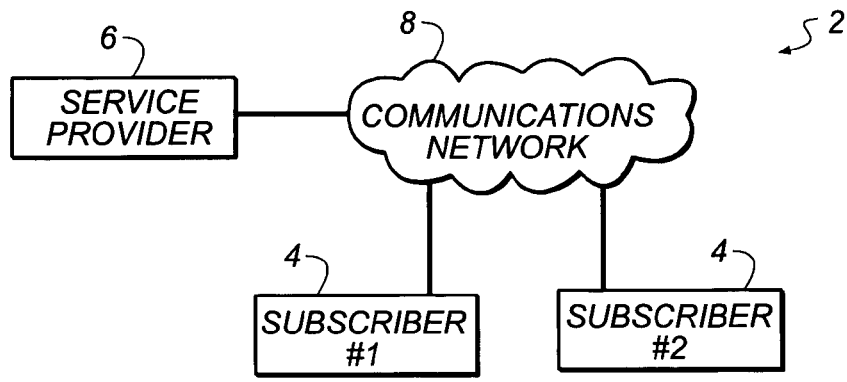
FIG. 1a is diagram of a system capable of practicing the present invention.

FIG. 1a illustrates a system 2 that is capable of practicing the present invention. In particular, there is illustrated a subscriber computer 4 that is capable of communicating with a service provider 6 over a communication network 8 such as the Internet. The computer 4 is a typical personal computer having an appropriate display device, keyboard, computer mouse and other items typically associated with personal computers. In the embodiment illustrated, two different subscriber computers of two different subscribers are illustrated, however, any number of subscribers may be connected to the system. The service provider 6, in the embodiment illustrated, is a photoservice provider capable of providing a wide range of products and services, for example but not limited to, storage of images, providing of image products such as photographic print, mugs, T-shirts, etc.

Figure 1B:
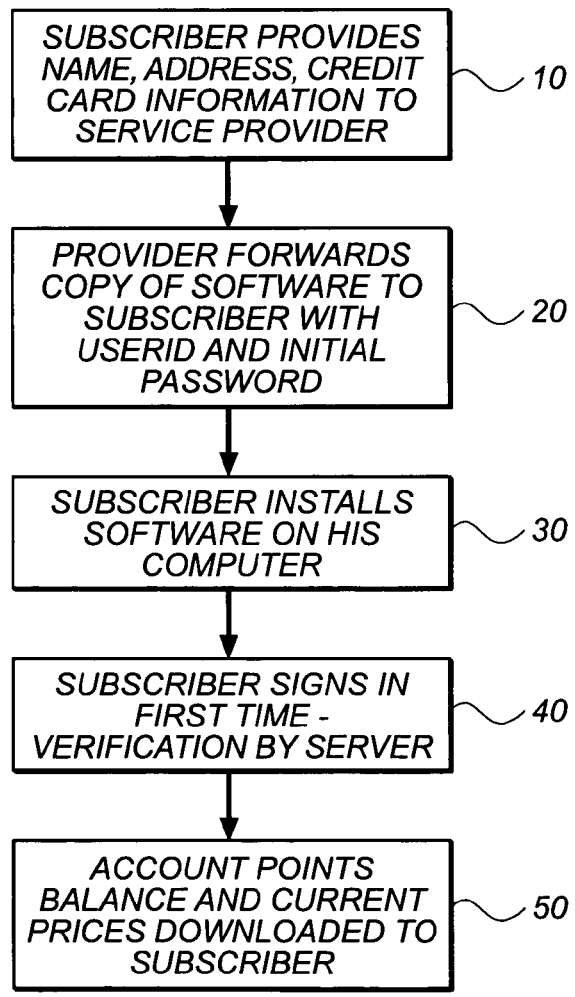
FIG. 1b is a flow chart describing the steps in the operation of the Initial Sign-up and Account Establishment Modes of the present invention.

A detailed description of the operation of the invention will now be provided. Referring first to FIG. 1b, there is provided a flow chart of the steps in the operation of the invention for the initial sign-up process for obtaining photographic services from a service provider and receiving a copy of the preprogrammed software to be used for accessing services and managing the account of the subscriber. In the following discussion, an individual/user who has successfully signed up to use the service and associated software will be referred to as a "subscriber".

At step 10, the prospective subscriber contacts a service provider offering the service to request purchase, and provides name, address and credit card or other billing information. The initial contact with the service provider can be by telephone or on the service provider's website, or by filling out a form and forwarding it by mail to the service provider. In a preferred embodiment, the amount of money initially remitted by the prospective subscriber will be used to purchase a predetermined amount of credit. The credit may be expressed in actual cash available or by points used for purchasing goods and/or services wherein the cost is expressed in points. The credit is used by the subscriber to purchase products and/or services. Alternatively, a prospective subscriber may be supplied a copy of the software first (for example with the purchase of a digital camera), and be offered the opportunity to purchase credit points for goods and services later. In yet another embodiment, the prospective subscriber may be provided both the software and an initial number of credit points for free, as a trial and/or inducement to sign up for a contract for additional service later.

At step 20 the service provider forwards a copy of the software to the subscriber along with an initial user identification and password the subscriber will use for the initial sign-in. The software copy may be provided on a removable memory medium which is mailed to the subscriber, or the software may be downloaded to the subscriber's computer directly from the service provider's server over a communications network such as the Internet. In step 30, the subscriber installs the software on his computer.

Once the software has been installed on the subscriber's computer, the subscriber performs an initial sign-in in step 40 whereby the service provider's server is contacted over a communications network and the user ID (identification) and initial password are input by the subscriber. When the server recognizes the user ID and password, the account is verified and the subscriber is provided an opportunity to change the initial password to a personal password to be used in subsequent transactions.

After verification, the service provider in step 50 downloads the account status with respect to amount of credit available and a current pricelist (expressed in the appropriate value) for goods and services offered is downloaded to the subscriber's computer.

After the initial sign-in process has been completed as described above, the subscriber is able to use the various features of the software and service without having to be in direct communication with the service provider during the ordering process on the subscriber's computer. The modes of operation of these features will now be described in detail.

Ordering Mode

Figure 2:
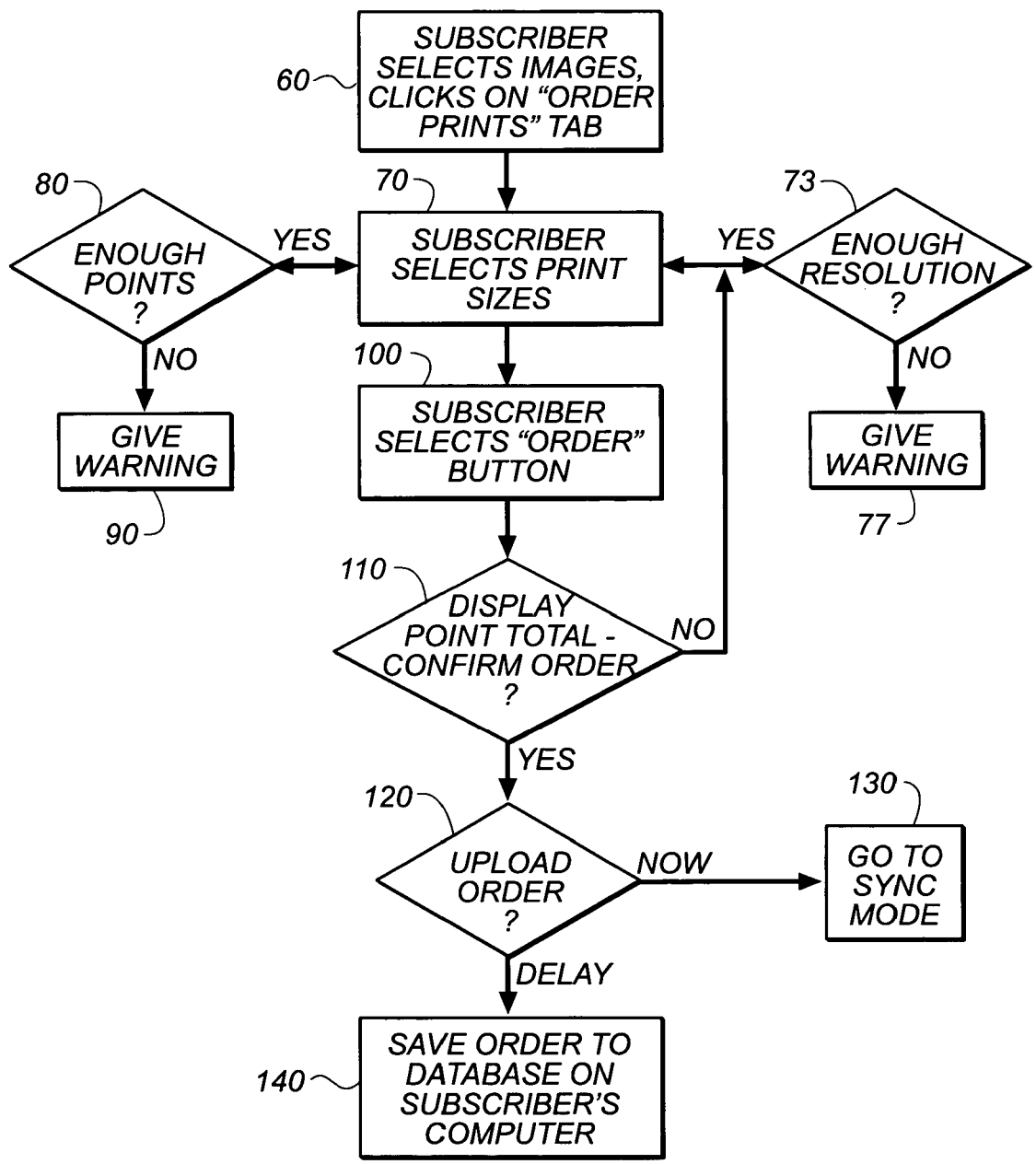
FIG. 2 is a flow chart describing the steps in the operation of the Ordering Mode of operation of the present invention.

In FIG. 2 is shown a flow chart of the steps in the operation of the preprogrammed software in the mode of placing an order for photographic products, such as prints. In order to use the preprogrammed software to compose an order for products, it is not necessary for the subscriber's computer to be in direct communication with the server of service provider. An entire order can be composed off line and the status of the account with respect to the number of points needed to pay for the order, the account balance of remaining points, etc, can be reviewed prior to connecting to the remote service provider to place the order. The ability to completely compose an order and confirm payment prior to connecting to the service provider's website saves time for the subscriber and simplifies the task of ordering prints.

In step 60 of FIG. 2, the subscriber, using the software on the subscriber's computer, first selects images for which hard copy prints are desired. In a preferred embodiment, the images are selected by the subscriber from a screen or series of screens displayed on the subscriber's computer where all the subscriber's images are represented as "thumbnail images".

Figure 7A:
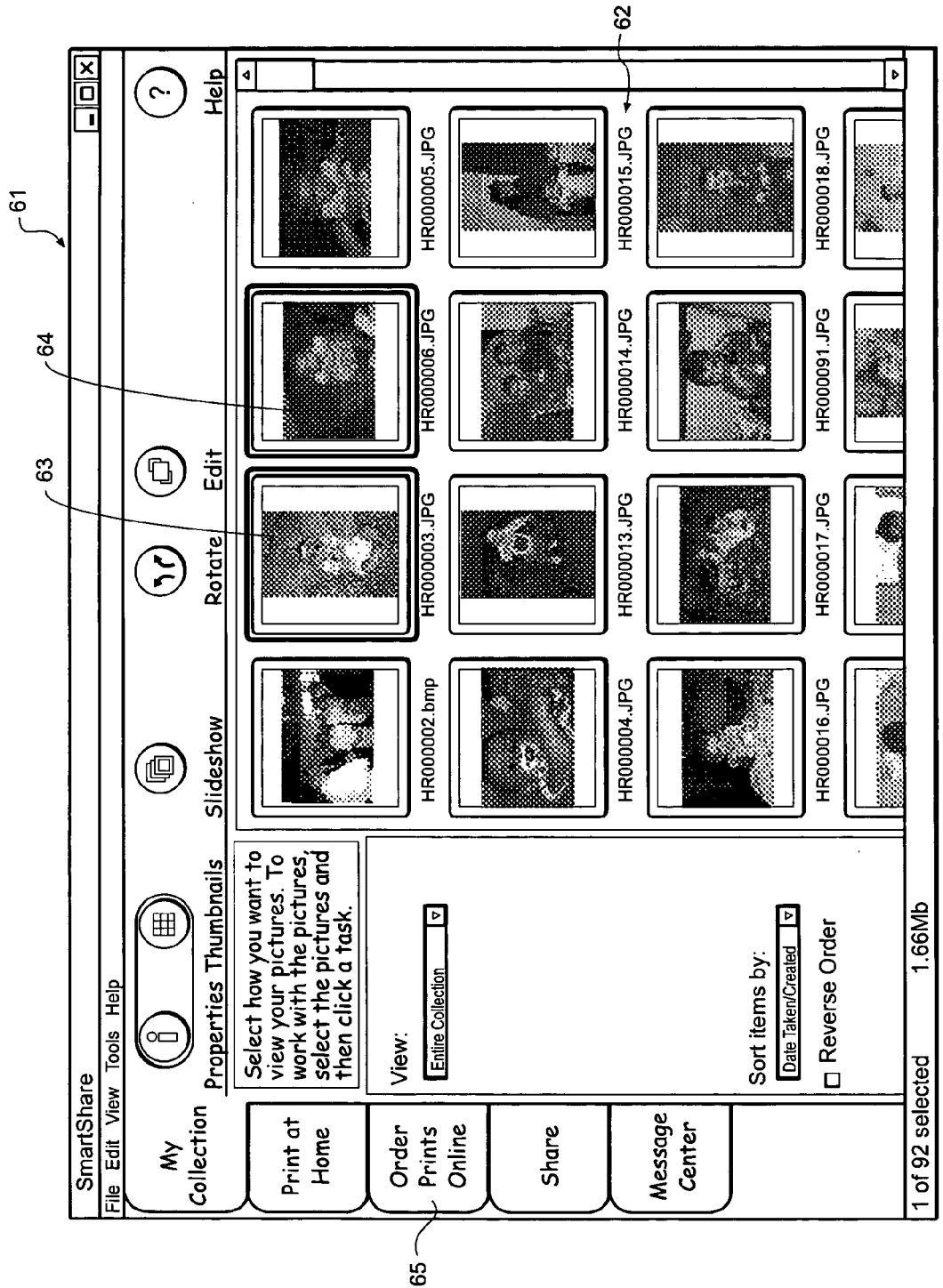

FIG. 7*a* illustrates such a computer screen 61 that the subscriber would see using the software made according to the present invention, where thumbnail images 62, which are representations of the subscriber's image collection, are displayed. The selection of images for printing may be made when the subscriber left-clicks on the images for which prints are desired. In FIG. 7*a*, images 63 and 64 are shown as having been selected in this manner. In an alternative embodiment (not shown), selections may be made by selecting a box next to the images. It will be further understood that any other well-known prior art means for making a selection on a computer screen may also be used. Thumbnail images 62 are linked to the actual storage location of the corresponding image data files, which may be on the hard drive of the subscriber's computer 4, or on a removable storage medium, or on an image server located at the service provider. When the selection of images has been completed, the subscriber selects the "Order Prints" mode of operation, for example by clicking on a tab or button 65 (FIG. 7*a*) labeled "Order Prints." In yet another alternative embodiment, the software allows the subscriber to browse and select stored image files on the subscriber's computer 4 by scanning titles, or other unique identifiers of the images with which the subscriber is familiar, wherever these image files may be located.

Continuing with FIG. 2, in step 70, the subscriber is next prompted to select the print sizes desired. Typically, the selection will be from among a choice of a number of standard print sizes, such as 4×6, 5×7, 8×10, etc, but it will be understood that any size may be available for order from the service provider. Next, in step 73, the software makes a determination as to whether the resolution of the data file is sufficient to provide a good quality print at the size requested. If there is not sufficient resolution, the subscriber is notified in step 77, and is then provided the opportunity to select a smaller print size. It will also be understood that, in addition to prints, any type of image-bearing product may be ordered such as posters, mugs, T-shirts, mouse-pads, and the like, as well as image products bearing multiple images such as album pages, photo collages, or photo books.

While the selection is being made by the subscriber, the preprogrammed software keeps a running total of the amount of credit required to purchase the items selected compared to the credit available in the subscriber's account. In step 80 the software provides an instantaneous accounting and on-screen display of account status to the subscriber. If the amount of total available credit is exceeded at any time, then a warning is provided to the subscriber in step 90. The warning may comprise, for example, the total amount of additional credit required to purchase the order being displayed in a different color, or by flashing the total, or by some auditory alarm or chime, or pop-up window, or any of a number of other well known means of providing a signal to the user of a computer. If such a warning (step 90) is given, the subscriber is allowed to alter the order by returning to step 70 to modify his selection. Alternatively, the subscriber may continue with the order, with the understanding that he will be billed separately for the overage, or be given an opportunity to purchase more credit to increase the amount available in his account (see later description of the operation of the system in the section entitled "Sync Mode").

Figure 7B:
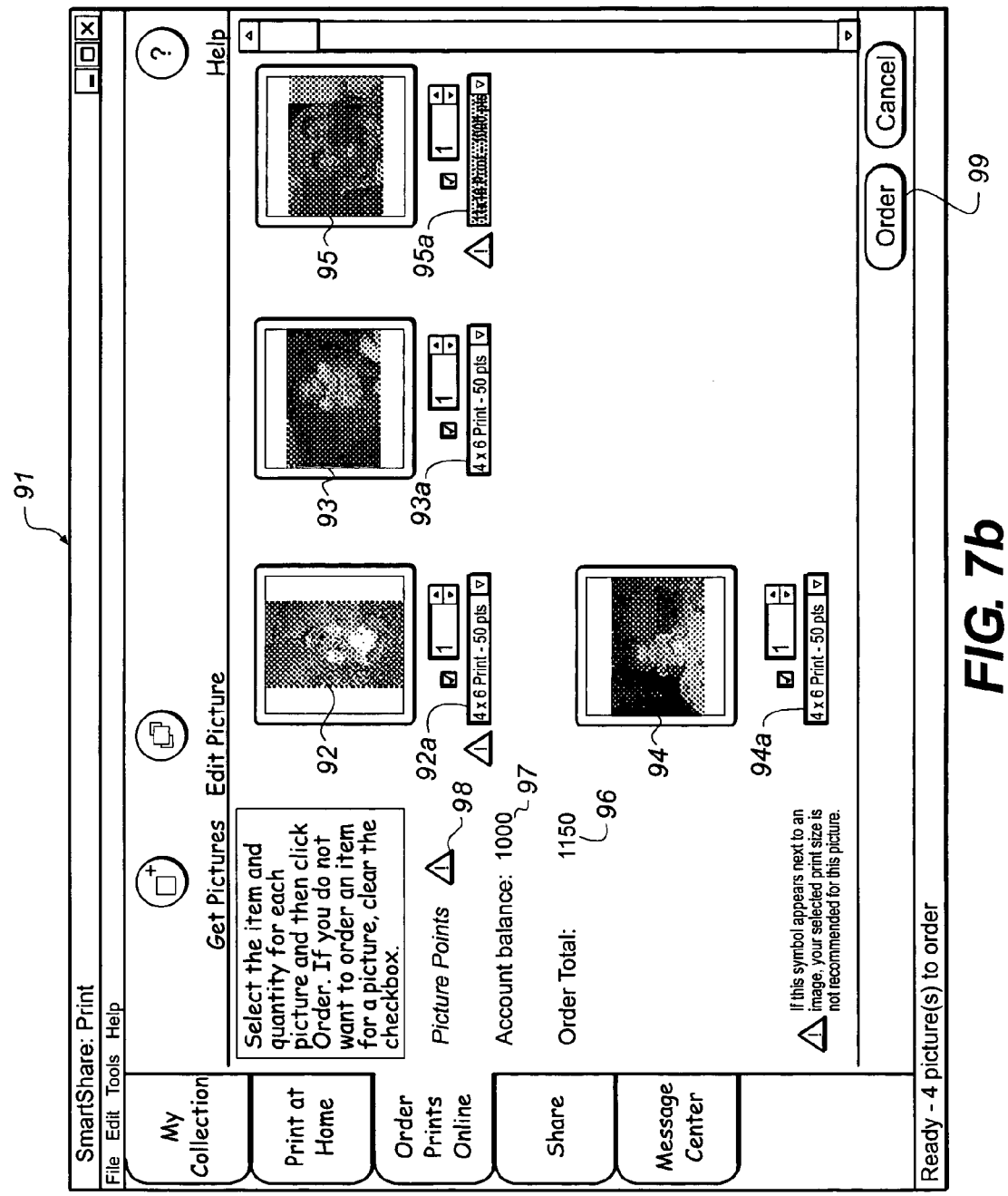

In FIG. 7*b* there is shown a computer screen 91, made according to the present invention, for use by the subscriber in making print order selection. For images 92, 93 and 94, 4×6 in. print sizes have been selected by a subscriber as shown on pull-down menus 92*a*, 93*a* and 94*a* respectively. For image 95, an 11×14 in. print size has been selected using menu 95*a*. The required credit (which in the embodiment illustrated is expressed in points) total to complete the order is 1150 points as indicated by order total indicator 96. Since the available account balance as indicated by account balance indicator 97 is only 1000 credit points, a warning 98 has been issued alerting the subscriber that the account point balance 97 is not large enough for the order to be completed.

Returning now to FIG. 2, if the subscriber is satisfied with the selections made, he next selects a button or tab labeled "order" in step 100 (see order button 99 in FIG. 7*b*).

In step 110 the preprogrammed software displays the final point total required to complete the order, shows the number of credit points remaining in the subscriber's account, and the subscriber is asked to confirm the order by selecting a button or tab labeled "confirm."

FIG. 7*c* shows such a confirmation screen 111 where account balance 112, order total 113 and remaining balance 114 are displayed. Selection buttons 115 and 116 are used by the subscriber either to confirm or cancel the order.

Returning to FIG. 2, if the subscriber decides in step 110 not to confirm the order, then he is returned to step 70 to further modify selections. If the subscriber confirms the order in step 110, then, in step 120, he is prompted to decide either to place or to store the order for placement later. If the subscriber has elected in step 120 to place the order immediately then, in step 130, the subscriber's computer is automatically connected to the server of the service provider in the Sync Mode of operation and the order is uploaded immediately (see later explanation of the operation of the "Sync Mode"). Or if the subscriber wishes, he may decide in step 120 to delay placing the order with the service provider 6 in which case the order is saved to an order database located on the subscriber's computer (step 140).

FIG. 7*d* depicts a computer screen 121 where the subscriber may input an election to upload the order immediately by selecting the "Upload Now" button 122, or to wait until the next time the software connects to the provider's server by selecting the "Wait for Sync" button 123.

Sharing Mode: Electronic Sharing

Figure 3:
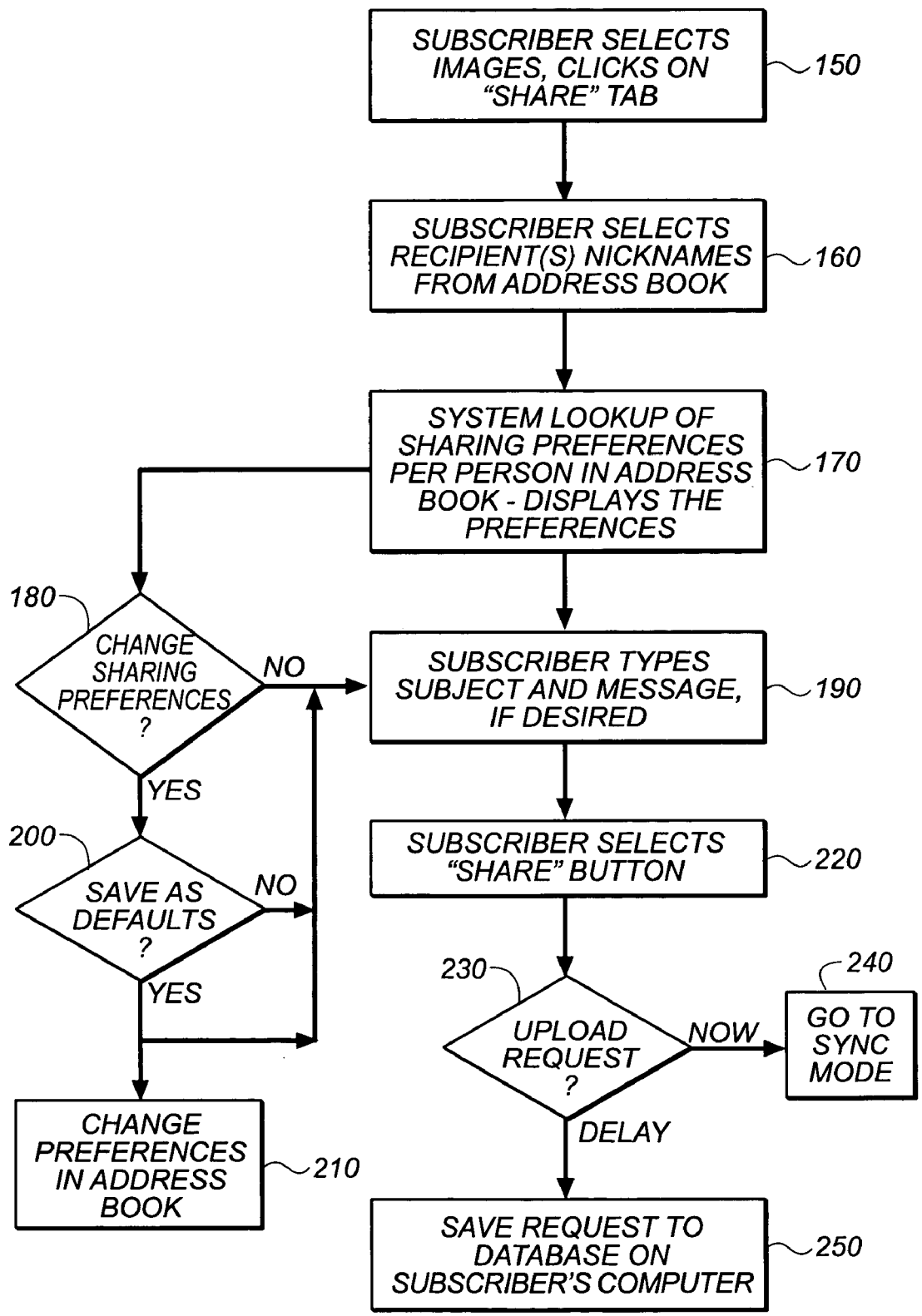
FIG. 3 is a flow chart describing the steps in the operation of the Electronic Sharing Mode of operation of the present invention.

In FIG. 3 is shown a flow chart of the steps in the operation of the preprogrammed software made in accordance with the present invention when the subscriber wishes to share images electronically (e.g., sharing by email). In order to use the preprogrammed software to prepare a request for electronic sharing of images, again it is not necessary to first connect to the server of the service provider over a communication network. In the preferred mode of operation of the invention, electronic sharing is most easily and conveniently carried out with so-called member-subscribers who all have the same preprogrammed software installed on their computers and who have subscribed to the service with the same remote photographic service provider. However, electronic sharing with other recipients, not member subscribers, may also be carried out. As will also be seen by the description below, the preprogrammed software eliminates the need for proper sizing of images for electronic sharing and thereby greatly simplifies the task of electronic sharing.

In step 150 of FIG. 3, the subscriber first selects images for electronic sharing in a manner exactly analogous to that previously described before for the Ordering Mode of operation, and then selects the sharing mode of operation by clicking on a tab or button labeled "Share".

Next, in step 160, the subscriber is prompted to select recipient(s) for sharing from a "nickname" file associated with the subscriber's address book. The use of address books and nickname files on a computer, associated for example with software for sending email, is well known by those skilled in the art, and will not be described in detail here. Typically, names may be selected by clicking on them from lists using a mouse, or from pull-down menus, or by use of any other of a number of well-known selection means.

Figure 7E:
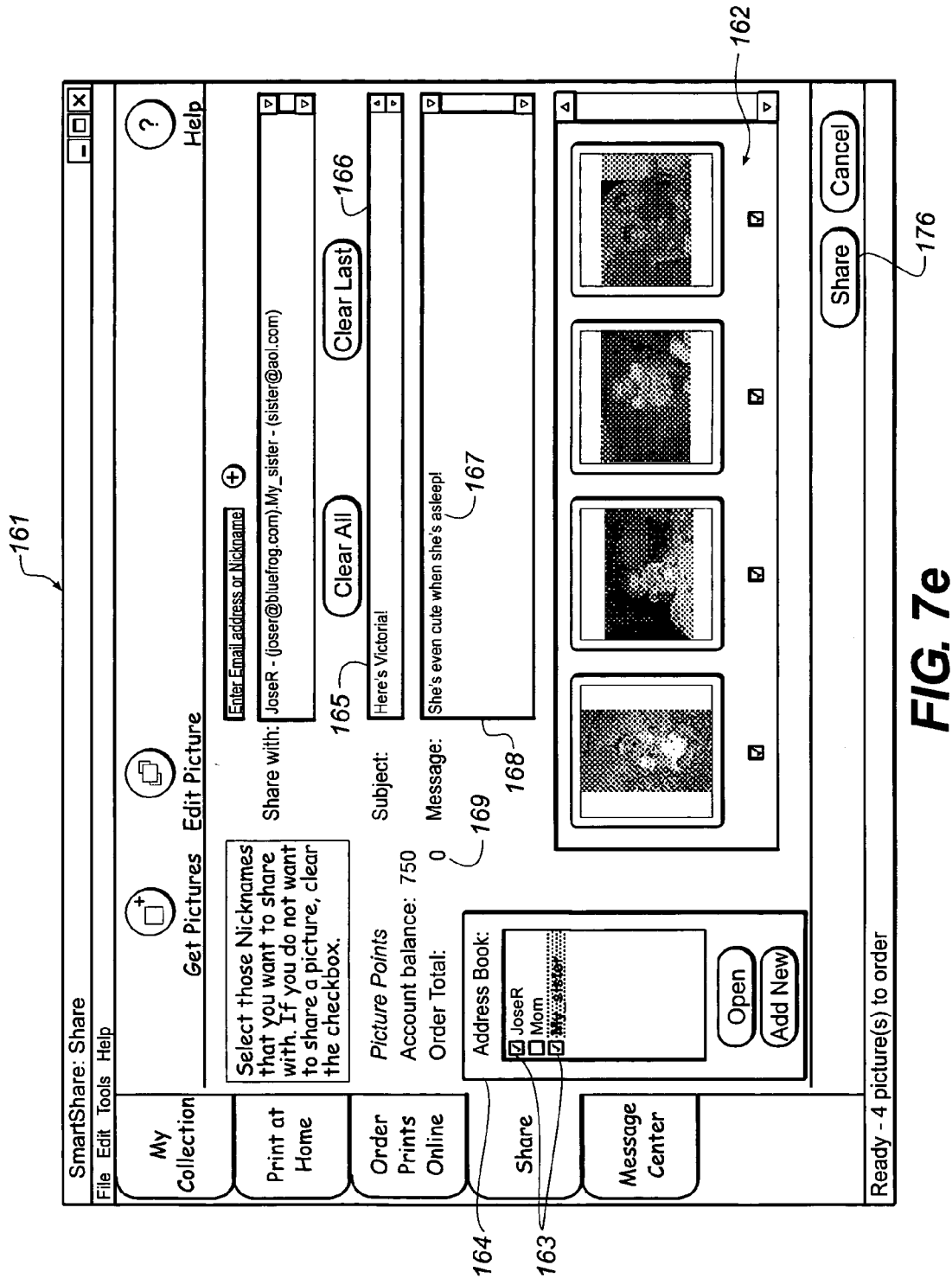

FIG. 7*e* depicts a computer screen 161 made according to the present invention, for use by a subscriber to create a sharing order. As illustrated in FIG. 7*e*, four images have been selected for sharing and are displayed as "thumbnail" images 162. Two recipients 163 have also been selected for sharing as indicated in the Address Book display box 164.

Figures 7F, 7G:
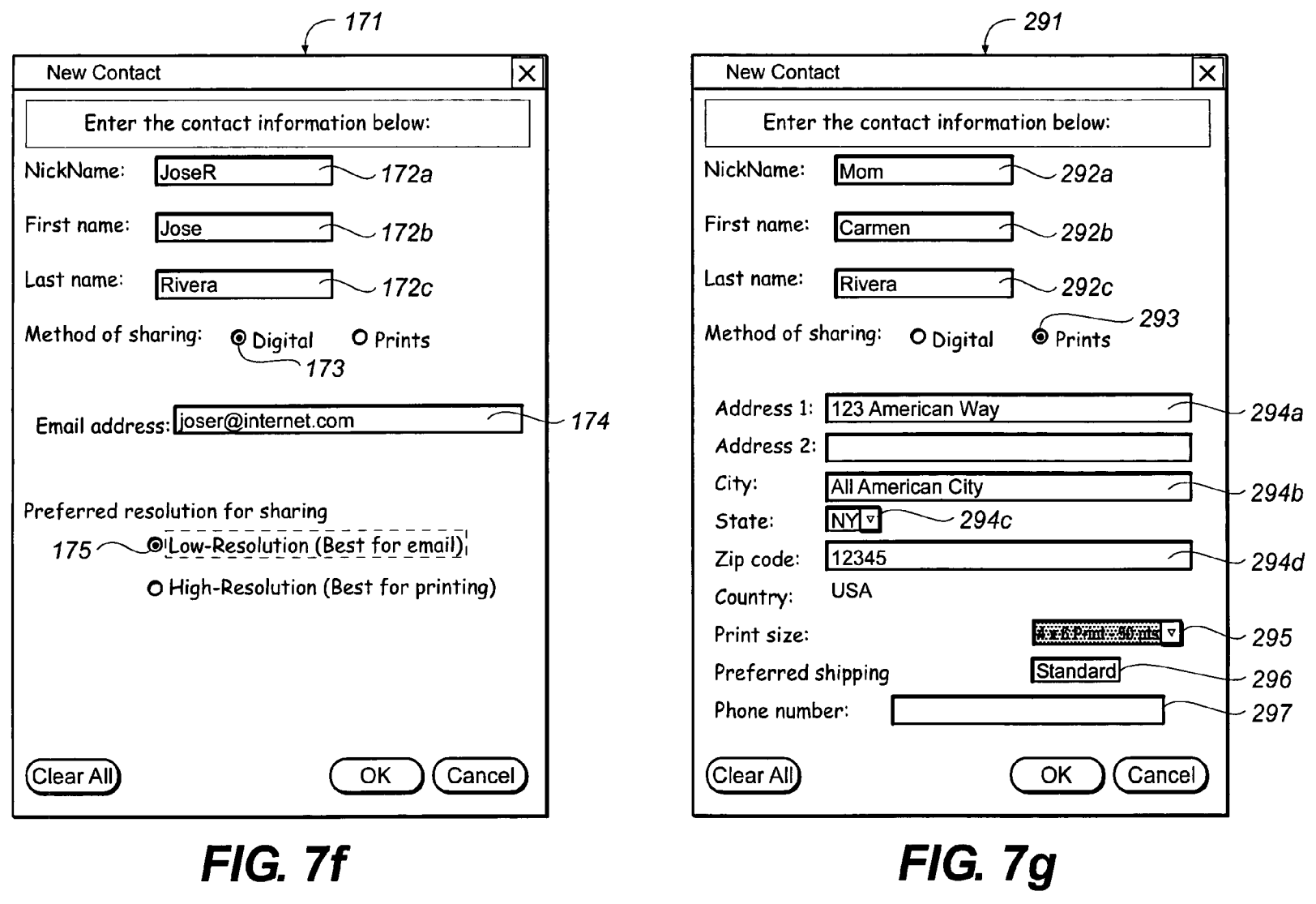

Returning to FIG. 3, in step 170 the preprogrammed software next performs a lookup of the stored sharing preferences for each recipient selected and displays these preferences to the subscriber. In FIG. 7*f,* a computer screen 171 is shown displaying such a sharing preference for a subscriber. The sharing preference screen 171 shows recipient nickname 172*a*, first name 172*b*, last name 172*c* and selected mode of sharing 173 (in this instance "digital" is selected, indicating the electronic mode of sharing is desired). Also shown is the recipient's email address 174 and preferred resolution for sharing 175 (in this instance low resolution best for email).

Returning to FIG. 3, in step 180, the subscriber is given the opportunity to change the stored sharing preferences for the recipients selected. For example, the email address or sharing resolution may need to be updated or changed. If changes to the sharing preferences are made in step 180, the subscriber is given the opportunity to save the changes as the permanent default preferences in step 200 and the changes are made permanent in the address book in step 210. If the subscriber does not wish to make any changes to preferences, or once any new preferences have been made and any saved as desired, the system moves on to the next (step 190).

In step 190, the subscriber is given the opportunity to provide either a subject line for the shared image(s), or other additional message to be transmitted along with the electronically shared image(s) in the form of email or other electronic messaging format.

Turning again to FIG. 7*e*, there is illustrated subject line 165 added to subject box 166 and a message 167 added to message box 168. Order total 169 is shown as "0" as electronic sharing is a free service in this embodiment of the invention. When satisfied with the selections made for electronic sharing, the subscriber selects a button 176 labeled "Share".

Returning to FIG. 3, after the share button has been selected in step 220 the subscriber, in step 230, may elect to initiate the sharing request immediately, or to store the request for execution later. If the subscriber elects to initiate sharing immediately, then, in step 240, the subscriber's computer is automatically connected to the server of the service provider over communication network 8 in the Sync Mode of operation and the electronic sharing request is uploaded immediately (see later explanation of the operation of the "Sync Mode"). If the subscriber decides in step 220 to delay initiating the sharing request, the request is saved to the order database located on the subscriber's computer (step 250).

Sharing Mode: Print and/or Electronic

Figure 4:
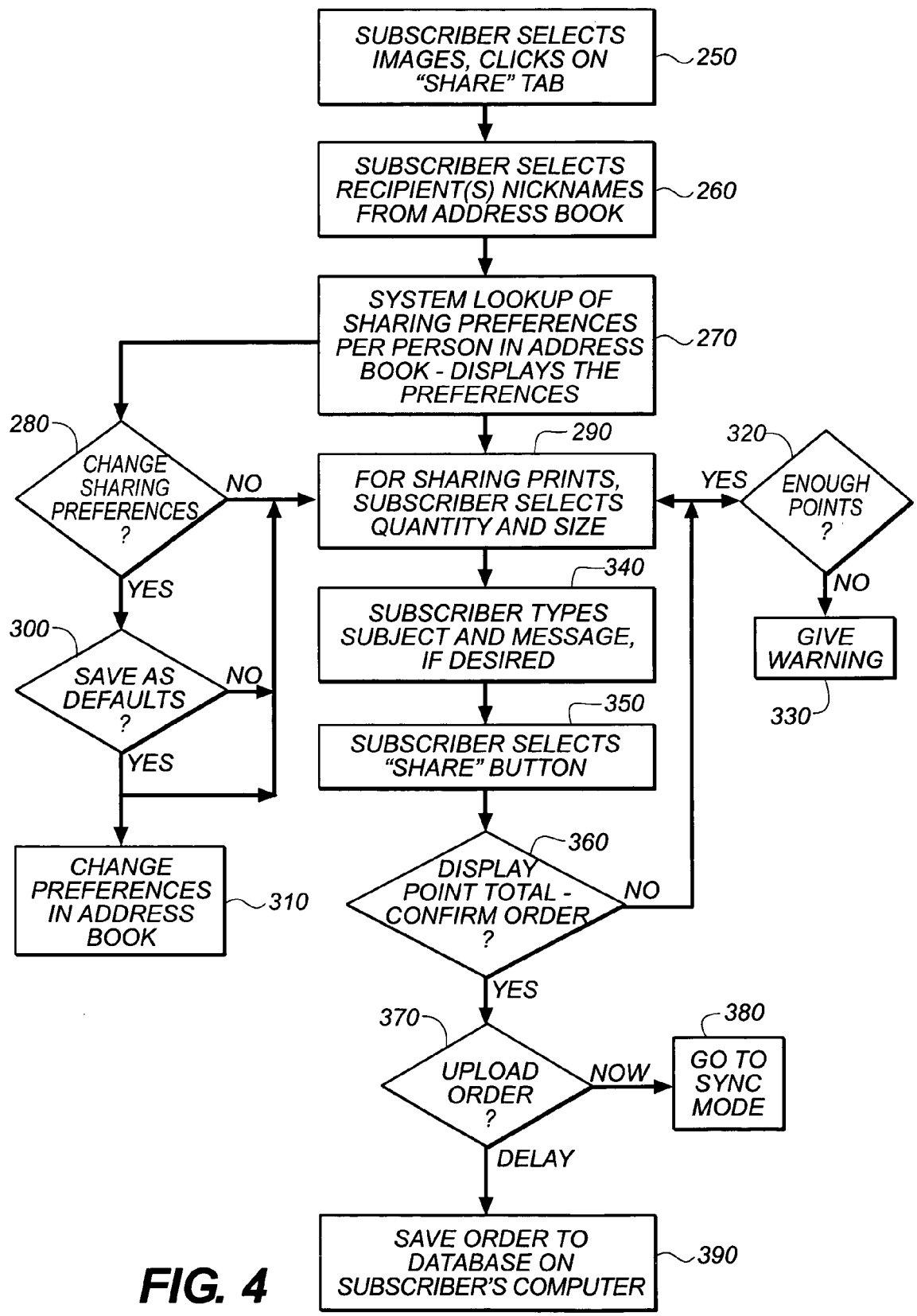
FIG. 4 is a flow chart describing the steps in the operation of the Electronic and/or Print Sharing Mode of operation of the present invention.

The preprogrammed software also enables the subscriber to easily share hard-copy prints, or to share hard-copy prints in combination with electronic sharing of images. As described previously for the functions of ordering or electronic sharing, it is not necessary for the subscriber to first connect to the server of the service provider before creating a sharing request. FIG. 4 shows the steps in the operation of the software for the sharing of hard-copy prints, or for combinations of sharing of hard-copy prints with electronic sharing. It will be seen that the process for sharing hard copy prints is greatly simplified by use of the pre-programmed software.

First, in step 250 of FIG. 4, the subscriber selects images for sharing, exactly as described previously for the Ordering and Electronic Sharing Modes of operation. The subscriber then selects the combination mode of operation by clicking on a tab or button labeled "Share".

Again, as described previously for other modes of sharing, in step 260 the subscriber is prompted to select recipient(s) for sharing from a "nickname" file associated with the subscriber's address book. As before, the subscriber is shown the stored sharing preferences (step 270) for each recipient designated and is given the opportunity to modify these sharing preferences (step 280). Any changes made may be saved if desired (step 300), and stored in step 310. If no changes are made in step 280, or after any changes to the preferences have been made and any saved as desired in step 310, the system then moves on to the next step (290). In step 290, for those recipients receiving prints, the subscriber designates print sizes and quantities in a manner entirely analogous to that described in step 70 in FIG. 2 for the "Order" mode of operation.

FIG. 7*g* depicts a typical sharing preference computer screen 291 for print sharing where a recipient's nickname 292*a* and first and last names (292*b* and 292*c*, respectively) are shown. Also shown is the selected method of sharing 293 (prints) and postal address information for the recipient, including street address 294*a*, city 294*b*, state 294*c* and zip code 294*d*. Additional items included on preference screen 291 include print size specification 295, shipping preference 296 and recipient phone number 297, if available.

Returning to FIG. 4, also as described previously for the "Order" mode of operation, while the selection of number of prints and print sizes for sharing is being made by the subscriber in step 290, the preprogrammed software keeps a running total of the amount of credit (points) required to purchase the items selected compared to the credit (points) available in the subscriber's account (step 320). As described previously, if the number of total available credit is exceeded at some point, then a warning is sent to the subscriber in step 330, and the subscriber is provided the opportunity to alter the order by returning to step 290 to modify his selection. Or, alternatively, the subscriber may continue with the order, with the understanding that he will be billed separately for the overage, or be given an opportunity to purchase more credit (e.g. points) to increase the amount available in his account (see later description of the operation of the system in the section entitled "Sync Mode").

Next, in step 340, the subscriber is given the opportunity to provide either a subject for the shared image(s), or other message to be transmitted along with the shared image(s). For hard-copy print sharing the message can be printed out by the service provider and inserted in the envelope with the shared prints. As described previously, for electronic sharing the message will be transmitted via email, or other means of electronic messaging. When satisfied with the selections made for sharing, the subscriber selects a button or tab labeled "Share" in step 350.

Figure 7H:
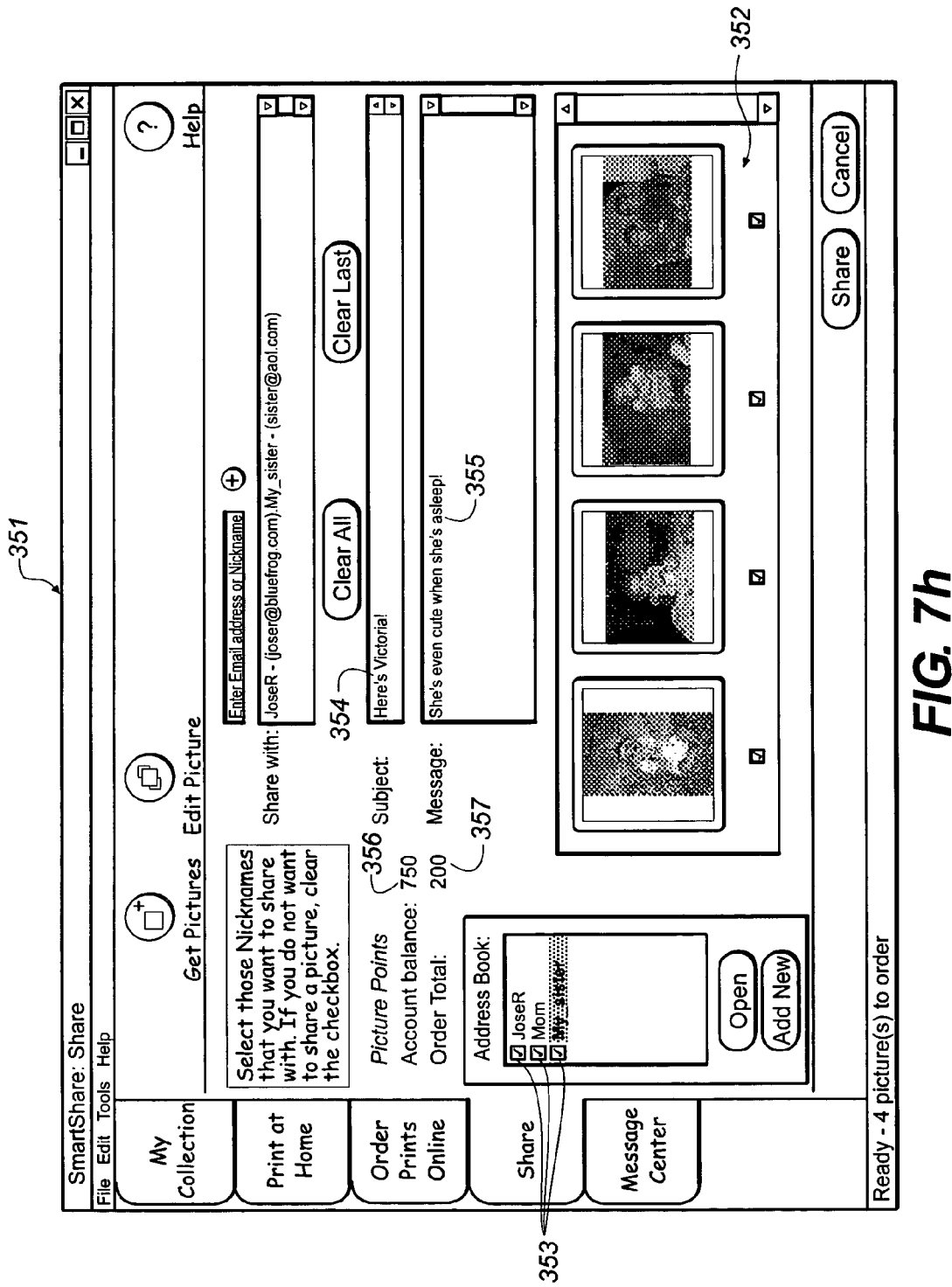

In FIG. 7h is illustrated computer screen 351 made according to the present invention and useful for specifying a print sharing order. As described previously for electronic sharing, screen 351 shows images 352 selected for print sharing, recipients 353, subject line 354 and message 355. Also displayed is an account balance indicator 356 showing 750 credit (e.g. points), and an order total indicator 357 showing 200 points will be needed to fulfill the order.

Continuing with FIG. 4, and in a manner analogous to the steps described previously for the print order mode of operation, in step 360 the preprogrammed software displays the final point total required to complete the order, shows the number of points remaining in the subscriber's account, and the subscriber is asked to confirm the order by selecting a button or tab labeled "confirm." If the subscriber decides in step 360 not to confirm the order, then he is returned to step 200 to further modify selections. If the subscriber confirms the order in step 360, then, in step 370, he is prompted to decide either to place the order immediately, or to store the order for placement later. If the subscriber elects in step 370 to place the order immediately, then in step 380, the subscriber's computer is automatically connected to the server of the service provider in the Sync Mode of operation and the order is uploaded immediately (see later explanation of the operation of the "Sync Mode"). Or if the subscriber wishes, he may decide in step 370 to delay placing the order, in which case the order is saved to an order database located on the subscriber's computer (step 390).

Sync Mode and Order Fulfillment

In the Sync Mode of operation, the preprogrammed software that is resident on the subscriber's computer 4 automatically establishes a connection via a communications network, for example the Internet, with the server of the photographic service provider 6. The subscriber has the option to activate the Sync Mode of operation of the preprogrammed software whenever it is deemed by the subscriber to be desirable to do so. For example, when an order for prints or for sharing has been completed, as described previously for FIGS. 2-4, the subscriber may elect to activate the Sync Mode of operation immediately and upload the order for completion immediately. Alternatively, the software may be set by the subscriber to automatically connect to the service provider at predetermined convenient times such as once/day at night, or at some other time of day or frequency. Once the connection is established, the Sync Mode is automatically launched and communications with the service provider, including the uploading of stored orders, can take place.

Figure 7I:
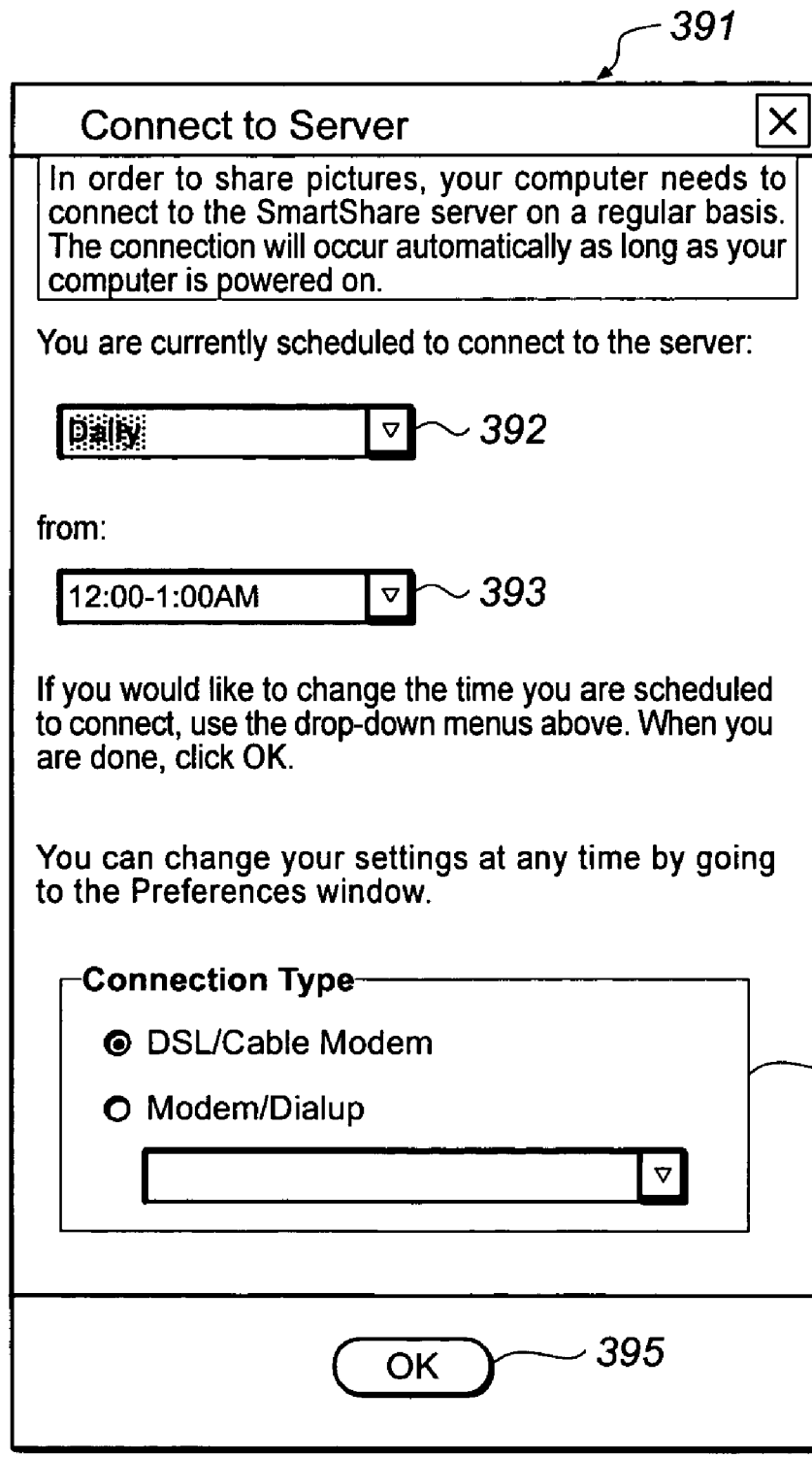

FIG. 7i shows a computer screen 391 made according to the present invention, which may be used by a subscriber to specify the schedule for launching of the Sync Mode of operation and connection to the server of the service provider. Screen 391 has pull down-menu 392 for specifying frequency (e.g. once/day) and pull-down menu 393 for specifying the time of day for the connection. In addition, window 394 allows for selection of the type of connection to the Internet the subscriber has. Once the preferences have been selected, the user selects the "OK" button 395 to make the selections permanent.

The connection with the service provider may be established by any of a number of well known prior art methods such as the automatic inputting of the stored electronic address of the service provider's server along with the subscriber's account number and any passwords needed to establish the authenticity of the subscriber's account. In the case where a subscriber accesses the Internet via a dial-up connection to an Internet Service Provider (ISP), the dial-up procedure is first carried out automatically and, once connection to the ISP has been established, the automatic connection to the service provider's server proceeds as described above.

Figure 5:
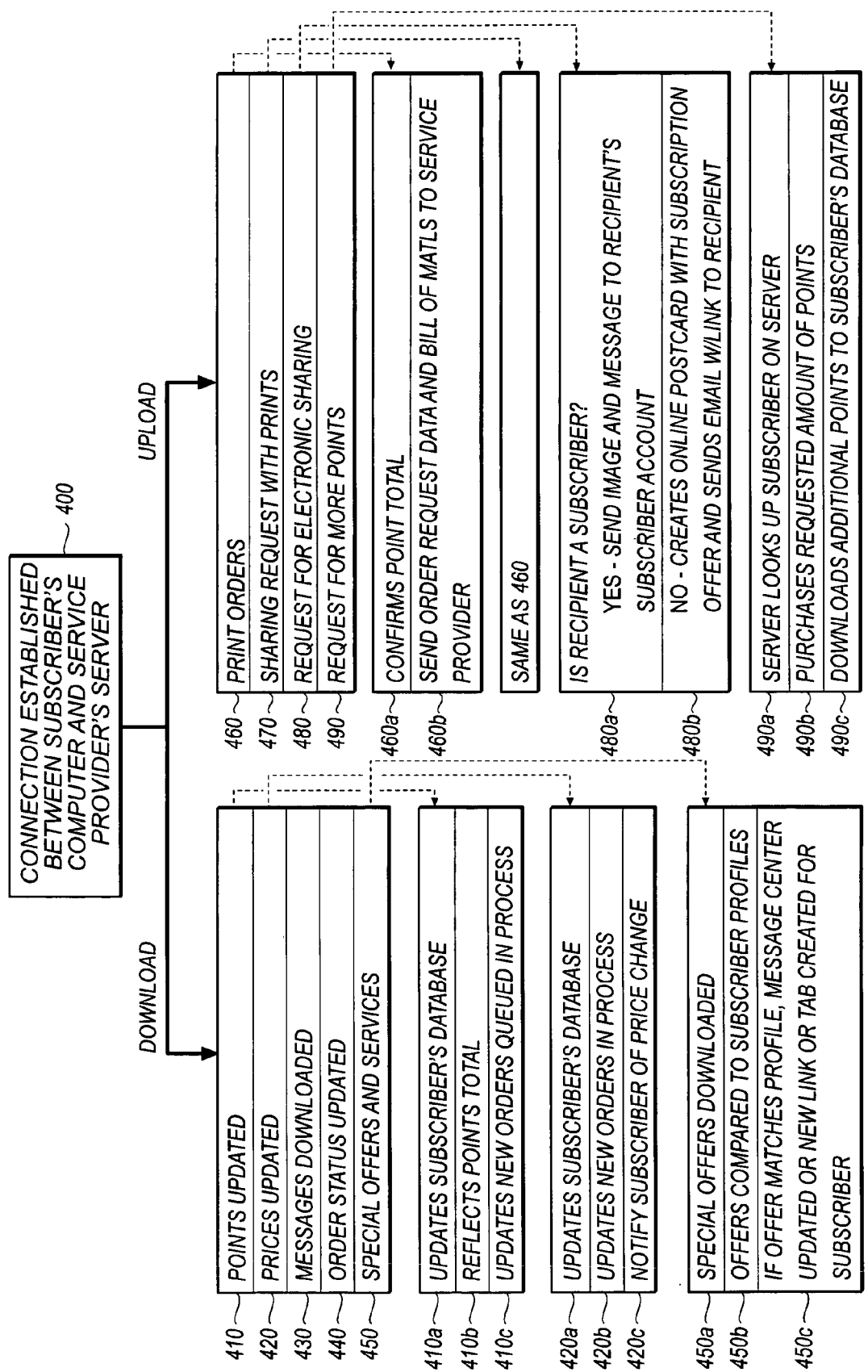
FIG. 5 is a flow chart describing the steps in the operation of the Sync Mode of operation of the present invention.

FIG. 5 shows a schematic diagram of the information-interchange functions which are enabled to take place between the subscriber's computer and the service provider's server once the connection has been established in the Sync Mode of operation. Detailed means for carrying out the automatic interchange of information between two or more computers which are connected over a network is well known in the art and will not be described in detail here.

Once the connection between the subscriber's computer and the service provider's server has been established (step 400), information exchange may occur in either a Download, or Upload communication mode. In any particular session in which the connection has been established, either or both of these communication modes may be employed, depending upon the need as recognized by either the subscriber's or the service provider's computer. The functions carried out in the Download mode will be described first.

Download Mode of Sync Operation

In the Download mode of Sync operation, the service provider's server carries out the following functions, on an as-needed basis:

The "Points Updated" function (410) updates the subscriber's database of information with respect to the balance of credit available in the subscriber's account. Over time, differences may have arisen between the account balance stored on the subscriber's computer as determined by the preprogrammed software (see earlier description) and the actual account balance as determined by the service provider. For example, there may have been a price change, or a special discount implemented, since the last time an update was provided. In step 410, the subscriber's information database is updated (410a) with respect to the total credit available (410b) and credit required for completion of any new orders being submitted (410c).

The "Prices Updated" function (420) updates the subscriber's information database with respect to new prices implemented since the last update (420a), notifies the subscriber if prices have changed (420c), and applies the new prices to any new orders awaiting completion (420b).

The "Messages Downloaded" function (430) downloads any new text messages that have been directed to the subscriber's account from another member subscriber or from the service provider (see later discussion under "Message Center").

The "Order Status Updated" function (440) updates the subscriber's database with respect to the status of recent orders. Status information such as "print order completed and shipped", "print order waiting to be completed", "print sharing order will be completed and shipped on (date)", or the like, is provided to the subscriber by means of this function.

The "Special Offers and Services" function (450) provides information about special product and service offers or promotions to subscribers. Available offers are first matched for interest to the subscriber's stored interest profile (450b). As an example of such an offer, if a subscriber has an interest "scrapbooking", then they may be notified of a special offer of duplicate prints which are useful to a scrapbooker to cut and trim for insertion in a scrapbook. If there is a special offer which matches the profile of a particular subscriber, the Message Center (see later discussion of the operation of the Message Center) is updated for download to the subscriber, or an interactive link is automatically created in the subscriber's computer display to the product and service option available (450c). In an alternative embodiment, all special orders are downloaded to all subscribers, irrespective of their interest profile, when they become available, and the subscriber can select which, if any, to utilize (450a).

Upload Mode of Sync Operation

In the Upload mode of Sync operation, the subscriber's preprogrammed software carries out the following functions, on an as-needed basis:

In the "Print Orders" function (460) any new print order that has been compiled and stored in the subscriber's information database since the last Sync Mode operation is uploaded. An uploaded order comprises the uploaded images, the order request, and a detailed "bill of materials" including, for example, the number and size of each print ordered (460a). Upon receipt of the order, the service provider responds by confirming the point total required to fill the order and sending this information to the subscriber's system (460b).

If a sharing request includes prints (470) any new sharing request for prints is uploaded. Upload of the request and confirmation of the point total required to fill the request proceeds in a manner entirely analogous to that described previously for the Print Order function (460).

When a sharing request includes electronic sharing (480), the subscriber designates recipients for electronic sharing, as previously described. The service provider then determines if the designated recipient(s) are member subscribers or not. If a recipient is a subscriber, then the image to be shared is sent to the recipient's subscriber account along with any accompanying message (480a). If a designated recipient is not a subscriber, then an email is sent to the recipient containing a URL link to where the image may be viewed. In addition, an offer to become a subscriber may also be sent by email to the recipient (480b).

When a subscriber needs additional credit points to pay for a purchase, the subscriber activates the "Request for More Points (Credit)" function (490). The subscriber requests a specific number of credit points and the server looks up the subscriber's account on the server (490a). The subscriber then purchases the credit points (490b), preferably by authorizing a charge against a credit card number stored by the service provider. Alternatively, the subscriber may submit another credit card number, or use any other means of payment designated by the service provider. Once payment has been received, the service provider updates the subscriber's account with the additional credit points (490c).

Message Center Operation

The preprogrammed software running on the subscriber's computer provides a Message Center for routing messages from one subscriber to another. The Message Center links all subscribers in a "virtual private network" where messages may be shared only among the member base and no unsolicited messages (e.g. "spam") from outside the network can be communicated to the members. Communications to subscribers from the service provider regarding account activity, product or service promotions, and the like, are also routed to the subscriber via the Message Center.

Figure 6:
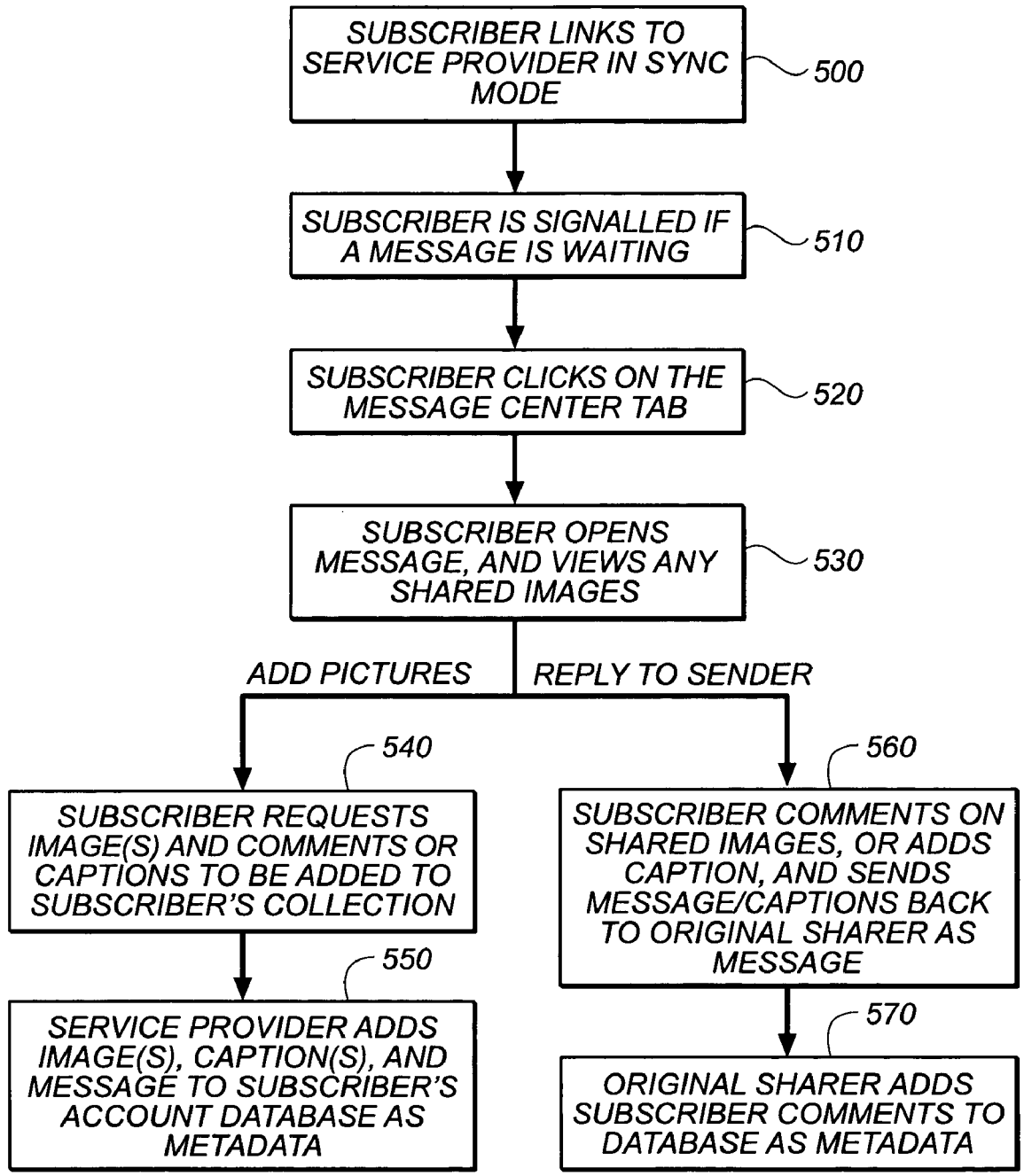
FIG. 6 is a flow chart describing the steps in the operation of the Sync Mode of operation of the present invention.

In FIG. 6, a flowchart of the operation of the Message Center is provided. In step 500 the subscriber links to the service provider in the Sync Mode, using the preprogrammed software running on the subscriber's computer, and as described in the sync mode operation. Any messages sent to the subscriber from another subscriber would be downloaded to the database. If a message is waiting for the subscriber, a signal is provided to the subscriber in step 510. Such a signal may be provided to the subscriber by any of a number of methods known in the prior art of communicating to the user of a computer. Some of the more common methods of signaling include a message flashing on the screen ("You Have a Message"), or an audible "beep" or chime, or digital voice message, or the like.

When the subscriber is signaled that a message has been received, the subscriber first selects the Message Center Tab (step 520), and then opens the message and views any images that have been shared (step 530). Typically, a message accompanying shared images may offer an explanation such as "Thought you'd like to see these pictures or our fishing trip", or a comment or caption such as "Your son looks like a future baseball star", or the like.

Once received, a subscriber may request (step 540) that any or all of the shared images and/or comments, captions and messages be added to the subscriber's permanent collection. When the request is received by the service provider, the service provider adds the image(s) to the subscriber's account database and adds the message(s), comment(s) and caption(s) to the database as metadata (step 550).

Figure 7J:
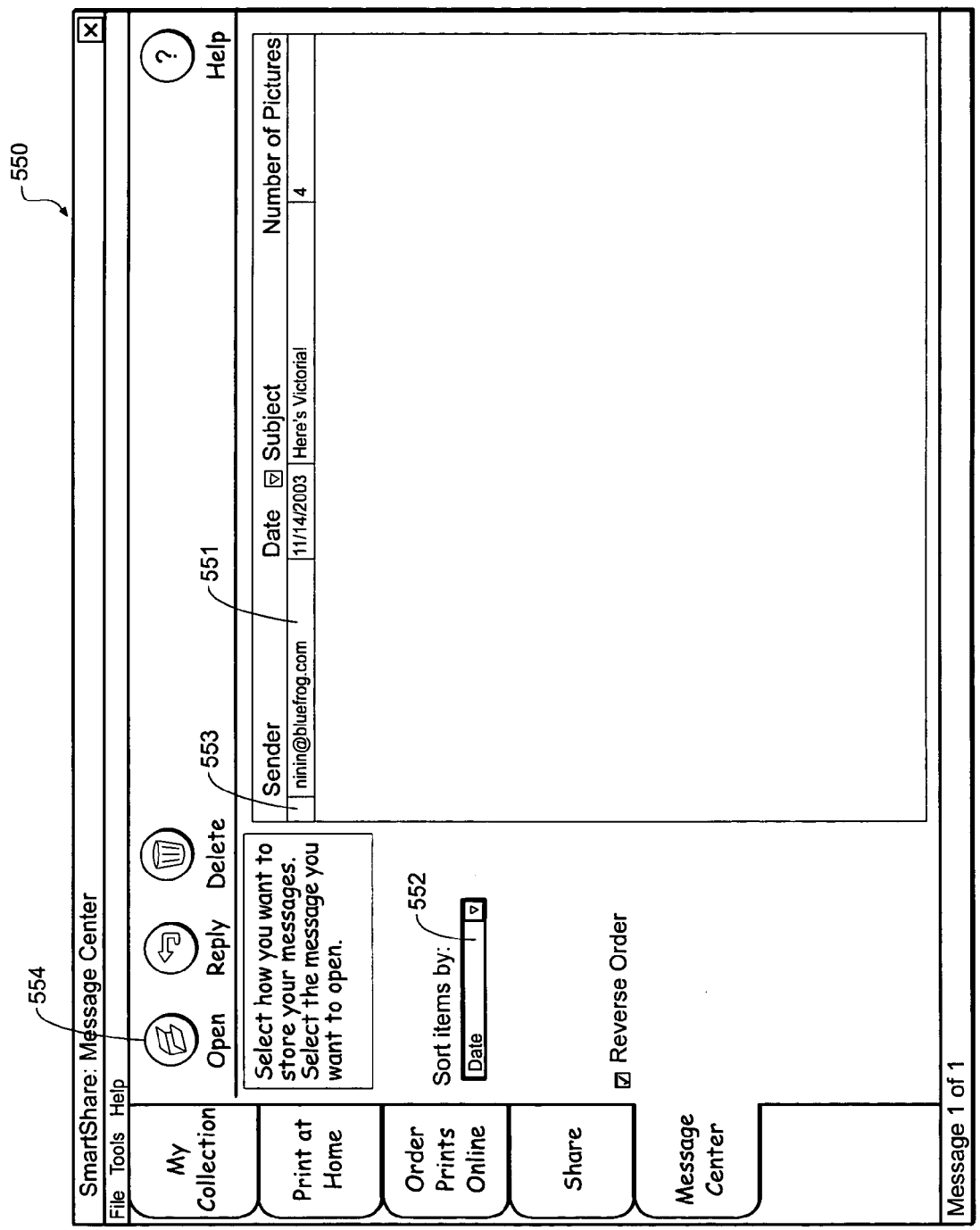

FIG. 7j shows a computer screen 550 made according to the present invention illustrating the appearance of the message center when a subscriber has a new message 551 waiting. Subscriber preferences regarding the order in which multiple messages are sorted are set using pull-down menu 552 (e.g., sorted by date, by sender, etc). A message is opened by selecting it using selection box 553 and then clicking on the "Open" button 554. It will be understood by those skilled in the art that any other well-known means for opening electronic messages may be employed such as by placing a cursor on the message and "double clicking".

Figure 7K:
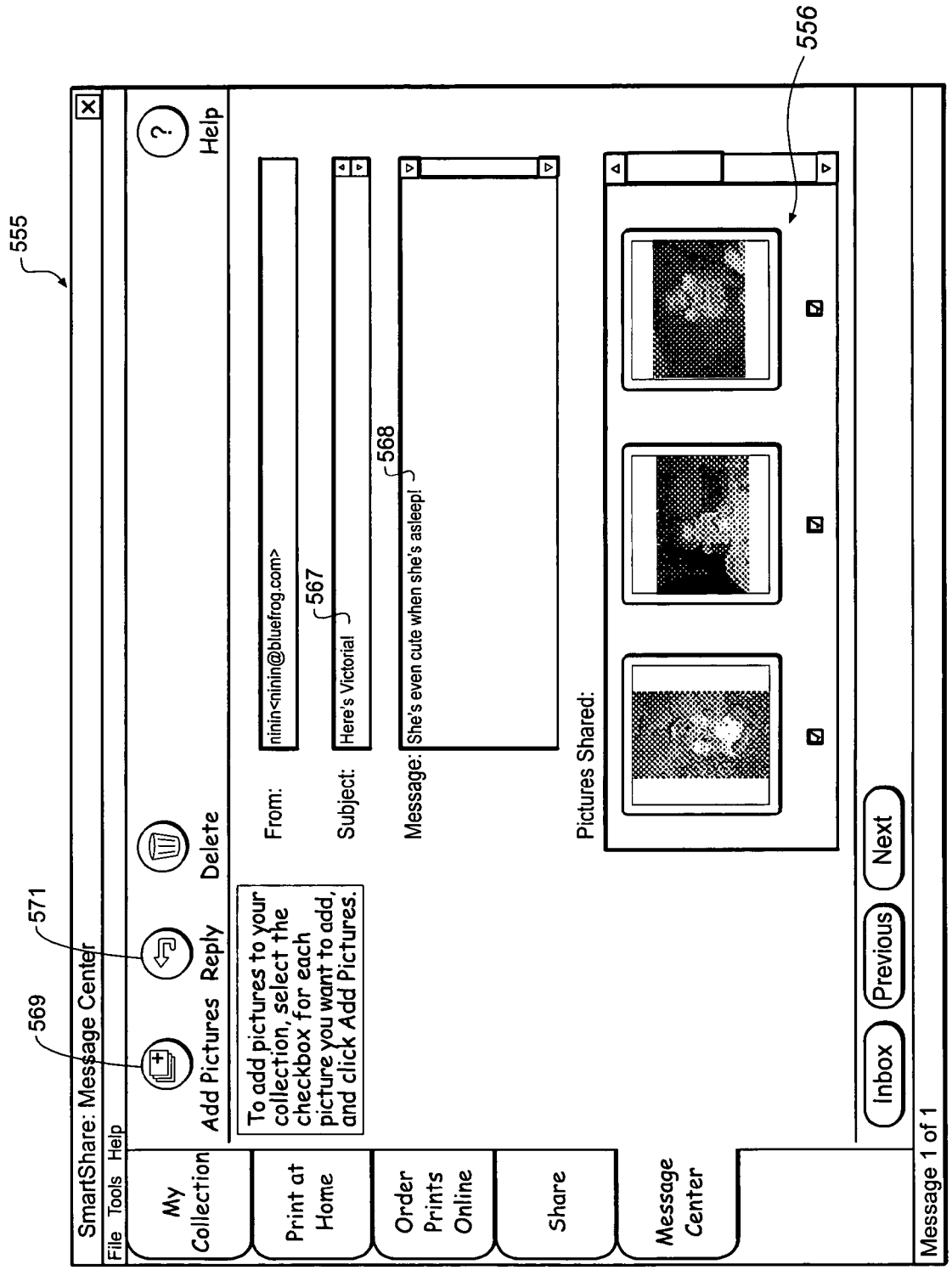
Figure 71:
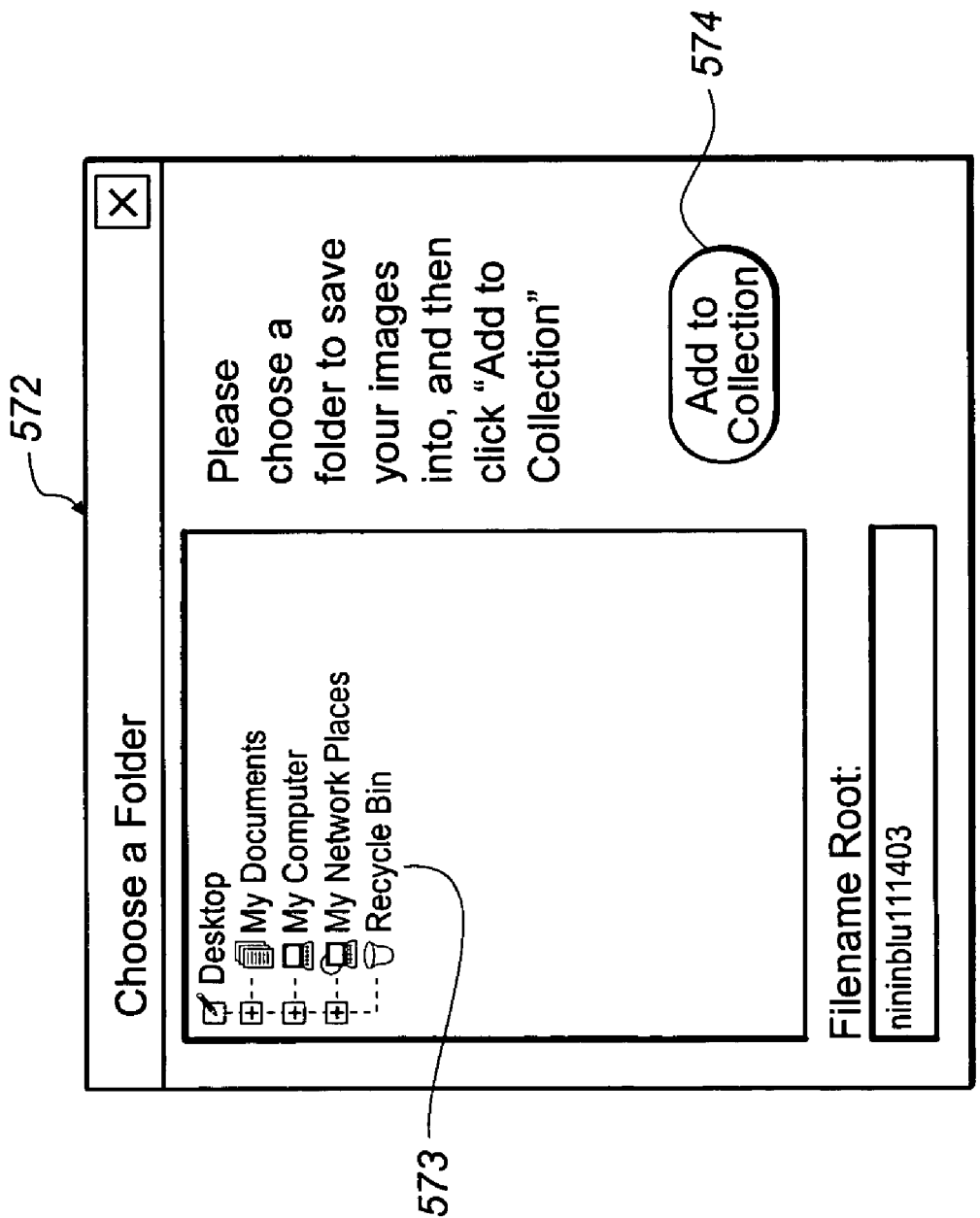

The appearance of the message when selected and opened is shown in FIG. 7k on computer screen 555. Screen 555 shows shared images 556, subject line 567 and message 568. Button 569 allows any of the shared images which have been selected, to be added to the permanent collection of the subscriber and button 571 allows the subscriber to reply to the message.

When the option to add shared images to the permanent collection is selected, computer screen 572 (FIG. 7l) appears and the subscriber is prompted to select a folder for storage using the file-navigator 573. Once a location has been specified, the subscriber clicks on the "Add to Collection" button 574 to add the pictures to his collection.

A subscriber may also use the Message Center to originate new messages in response to received images and messages. An example of the use of the Message Center to originate a message will now be discussed. As described previously, a subscriber responds to the signal that a message has been received in step 520 by selecting the Message Center Tab and opening any message and/or viewing any shared images (step 530). In step 560, the subscriber may select a Reply Tab and, once in the Reply mode, may comment upon the shared images, or add caption(s), and then send the message/captions back to the original sharer of the images. For example, a comment such as "I can't believe we caught all those fish", or "The picture of my son you sent was the actual moment he got his first hit as a Little Leaguer", or the like, may be appropriate. The return message is received and opened by the original sharer in a manner analogous to that already described. In step 570, the original sharer exercises the option, at his discretion, to add the new comments or captions to his database as metadata associated with the images that had been shared.

The invention has been described in detail with particular reference to certain preferred embodiments thereof, but it will be understood that variations and modifications can be effected within the scope of the invention.

PARTS LIST 2 system
4 computer
6 service provider
8 communications network
10 step
20 step
30 step
40 step
50 step
60 step
61 computer screen
62 thumbnail images
63 thumbnail image
64 thumbnail image
65 selection tab
70 step
73 step
77 step
80 step
90 step
91 computer screen
92 thumbnail image
92a pull-down menu
93 thumbnail image
93a pull-down menu
94 thumbnail image
94a pull-down menu
95 thumbnail image
95a pull-down menu
96 point total indicator
97 account balance indicator
98 warning signal
99 selection tab
100 step
110 step
111 computer screen
112 account balance indicator
113 order total indicator
114 remaining balance indicator
115 selection button
116 selection button
120 step
121 computer screen
122 selection button
123 selection button
130 step
140 step
150 step
160 step
161 computer screen
162 thumbnail images
163 recipient names
164 address book display window
165 subject line
166 subject window
167 message
168 message window
169 order total
170 step
171 computer screen
172a recipient nickname
172b recipient first name
172c recipient last name
173 sharing mode
174 recipient email address
175 sharing image resolution preference
176 selection button
180 step
190 step
200 step
210 step
220 step
230 step
240 step
250 step
260 step
270 step
280 step
290 step
291 computer screen
292a recipient nickname
292b recipient first name
292c recipient last name
293 sharing method
294a street address
294b city address
294c state address
294d zip code
295 print size specification
296 shipping preference
297 recipient phone number
300 step 310 step
320 step
330 step
340 step
350 step
351 computer screen
352 thumbnail images
353 recipients
354 subject line
355 message
356 account balance indicator
357 order total indicator
360 step
370 step
380 step
390 step
391 computer screen
392 pull-down menu
393 pull-down menu
394 selection window
395 selection button
400 step
410 software function
410a software function
410b software function
410c software function
420 software function
420a software function
420b software function
420c software function
430 software function
440 software function
450 software function
450a software function
450b software function
450c software function
460 software function
460a software function
460b software function
470 software function
480 software function
480a software function
480b software function
490 software function
490a software function
490b software function
490c software function
500 step
510 step
520 step
530 step
540 step
550 computer screen
551 message line
552 pull-down menu
553 selection window
554 selection button
555 computer screen
556 thumbnail images
560 step
567 subject line
568 message
569 selection button
570 step
571 selection button
572 computer screen
573 file-navigator
574 selection button

What is claimed is:

1. A method for placing an order for image-related goods and/or services from a remote service provider over a communication network from a subscriber computer, said service provider maintaining an account balance of said subscriber which includes an amount of credit available to the subscriber for placement of said orders with said service provider, comprising the steps of:

providing a preprogrammed software program for use on said subscriber computer for accessing said subscriber's personal digital image file collection on said subscriber computer, and allowing said subscriber to prepare said order while said subscriber computer is not connected to a computer server of said remote service provider over said communications network;

said subscriber creating said order using said preprogrammed software on said subscriber computer, said preprogrammed software displaying said subscriber's account balance to said subscriber after preparing said order but prior to connecting to said remote service provider over said communications network; and said subscriber computer forwarding said order for image-related goods and/or services to said remote service provider over said communications network wherein said status of said subscriber account balance on said subscriber computer is updated when said subscriber computer is connected to said computer server of said remote service provider.

2. The method according to claim 1 wherein said preprogrammed software program includes costs associated with goods and/or services that can be provided by said service provider.

3. The method according to claim 1 wherein said preprogrammed software program automatically updates the amount of credit available to said subscriber in response to said subscriber order.

4. The method according to claim 3 wherein said credit is set forth in terms of credit points credited to said subscriber account and the cost of said goods and/or services are set forth in terms of said credit points.

5. The method according to claim 3 wherein said credit available that is maintained on said preprogrammed software is compared with said credit available that is maintained by said remote service provider.

6. The method according to claim 1 wherein messages are sent to said subscriber by said remote service provider at the time said subscriber order is forwarded to service provider.

7. The method according to claim 6 wherein said message includes a confirmation of said order at the terms submitted by said subscriber.

8. The method according to claim 7 wherein said message includes a statement that the terms submitted by said subscriber are not acceptable.

9. The method according to claim 8 wherein new terms are proposed to said subscriber for placement of said subscriber order.

10. The method according to claim 1 wherein a message is provided to said subscriber of the availability for downloading images and/or information designated for sharing with said subscriber by a second subscriber of said service provider.

11. The method according to claim 10 further comprising the step of said subscriber adding said images and/or information shared by said second subscriber to said subscriber's personal digital image files.

12. The method according to claim 1 further comprising the step of said subscriber sending a response message to said second subscriber regarding said shared images and or information.

13. The method according to claim 1 wherein said creating of said order comprises the selecting of at least one image by said subscriber and at least one good or service to be provided by said service provider.

14. The method according to claim 11 wherein said at least one good or service comprises a print of said at least one image.

15. The method according to claim 1 wherein a message is provided to said subscriber that includes the automatic downloading of images of a second subscriber of said service provider that has indicated that said subscriber is to receive images and/or information designated by said second subscriber.

16. A computer software program loaded on to a subscriber computer causing said subscriber computer to perform the steps of:
creating a complete subscriber order on said subscriber computer;
forwarding said completed subscriber order of goods and/or services with respect to image files on said subscriber computer to a server at a remote service provider over a communications network with respect to an account balance of said subscriber located at said service provider;
said service provider maintaining an account balance of said subscriber which includes the amount of credit available to the subscriber for placement of orders with said provider, and
allowing said software program to be automatically updated at the time said order is received by said service provider so as to reflect the placement of said order and/or provide updated information to said software program regarding said account balance of said subscriber.

17. A computer software program according to claim 16 wherein said software program includes costs associated with goods and/or services that can be provided by said service provider.

18. A computer software program according to claim 16 wherein said software program automatically updates the amount of credit available to said subscriber in response to said subscriber order.

19. A computer software program according to claim 18 wherein said credit is set forth in terms of credit points credited to said subscriber account and the cost of said goods and/or services are set forth in terms of said credit points.

20. A computer software program according to claim 18 wherein said credit available that is maintained on said preprogrammed software is compared with said credit available that is maintained by said remote service provider.

21. A computer software program according to claim 16 wherein messages are sent to said subscriber by said remote service provider at the time said subscriber order is forwarded to service provider.

22. A computer software program according to claim 21 wherein said message includes a confirmation of said order at the terms submitted by said subscriber.

23. A computer software program according to claim 21 wherein said message includes a statement that the terms submitted by said subscriber are not acceptable.

24. A computer software program according to claim 23 wherein new terms are proposed to said subscriber for placement of said subscriber order.

25. A computer software program according to claim 16 wherein a message is provided to said subscriber of the availability for downloading images and/or information designated for sharing with said subscriber by a second subscriber of said service provider.

26. A computer software program according to claim 25 further comprising the step of said subscriber adding said images and/or information shared by said second subscriber to said subscriber's personal digital image files.

27. The method according to claim 26 further comprising the step of said subscriber sending a response message to said second subscriber regarding said shared images and/or information.

28. A computer software program according to claim 16 wherein said creating of said order comprises the selecting of at least one image by said subscriber and at least one good or service to be provided by said service provider.

29. A computer software program according to claim 16 wherein said at least one good or service comprises a print of said at least one image.

30. A computer software program according to claim 16 wherein a message is provided to said subscriber that includes the automatic downloading of images of a second subscriber of said service provider that has indicated that said subscriber is to receive images and/or information designated by said second subscriber.

31. A computer software program loaded on to a subscriber computer causing said subscriber computer to perform the steps of:
creating a complete subscriber order on said subscriber computer;
forwarding said completed subscriber order of goods and/or services with respect to image files on said subscriber computer to a server at a remote service provider over a communication network with respect to an account balance of said subscriber located at said service provider at later time when said subscriber is not using said software program; and
updating said subscriber account balance on said subscriber computer when said subscriber computer is connected to said remote service provider's computer server, said subscriber account balance including the amount of credit available to said subscriber for placement of orders with said service provider.

32. A computer software program according to claim 31 wherein said software program is automatically updated at the time said order is received by said service.

33. A computer software program according to claim 31 wherein said credit is set forth in terms of credit points credited to said subscriber account and the cost of said goods and/or services are set forth in terms of said credit points.

34. A computer software program according to claim 31 wherein said credit available that is maintained on said preprogrammed software is compared with said credit available that is maintained by said remote service provider.

35. A computer software program according to claim 31 wherein messages are sent to said subscriber by said remote service provider at the time said subscriber order is forwarded to service provider.

36. A computer software program according to claim 35 wherein said message includes a confirmation of said order at the terms submitted by said subscriber.

37. A computer software program according to claim 35 wherein said message includes a statement that the terms submitted by said subscriber are not acceptable.

38. A computer software program according to claim 37 wherein new terms are proposed to said subscriber for placement of said subscriber order.

39. A computer software program according to claim 31 wherein a message is provided to said subscriber of the availability for downloading images and/or information designated for sharing with said subscriber by a second subscriber of said service provider.

40. A computer software program according to claim 39 further comprising the step of said subscriber adding said images and/or information shared by said second subscriber to said subscriber's personal digital image files.

41. The method according to claim 40 further comprising the step of said subscriber sending a response message to said second subscriber regarding said shared images and/or information.

42. A computer software program according to claim 31 wherein said creating of said order comprises the selecting of at least one image by said subscriber and at least one good or service to be provided by said service provider.

43. A computer software program according to claim 31 wherein said at least one good or service comprises a print of said at least one image.

44. A computer software program according to claim 31 wherein a message is provided to said subscriber that includes the automatic downloading of images of a second subscriber of said service provider that has indicated that said subscriber is to receive images and/or information designated by said second subscriber.

* * * * *

UNITED STATES PATENT AND TRADEMARK OFFICE
CERTIFICATE OF CORRECTION

PATENT NO.         : 7,403,912 B2                                                Page 1 of 1
APPLICATION NO. : 10/732070
DATED              : July 22, 2008
INVENTOR(S)        : Jose E. Rivera et al.

It is certified that error appears in the above-identified patent and that said Letters Patent is hereby corrected as shown below:

Claim 12, Col. 17, line 1,    delete "claim 1" and insert --claim 11--
Claim 12, Col. 17, line 3,    delete "and or" and insert --and/or--

Signed and Sealed this

Twenty-fourth Day of March, 2009

JOHN DOLL
*Acting Director of the United States Patent and Trademark Office*